UNITED STATES PATENT OFFICE.

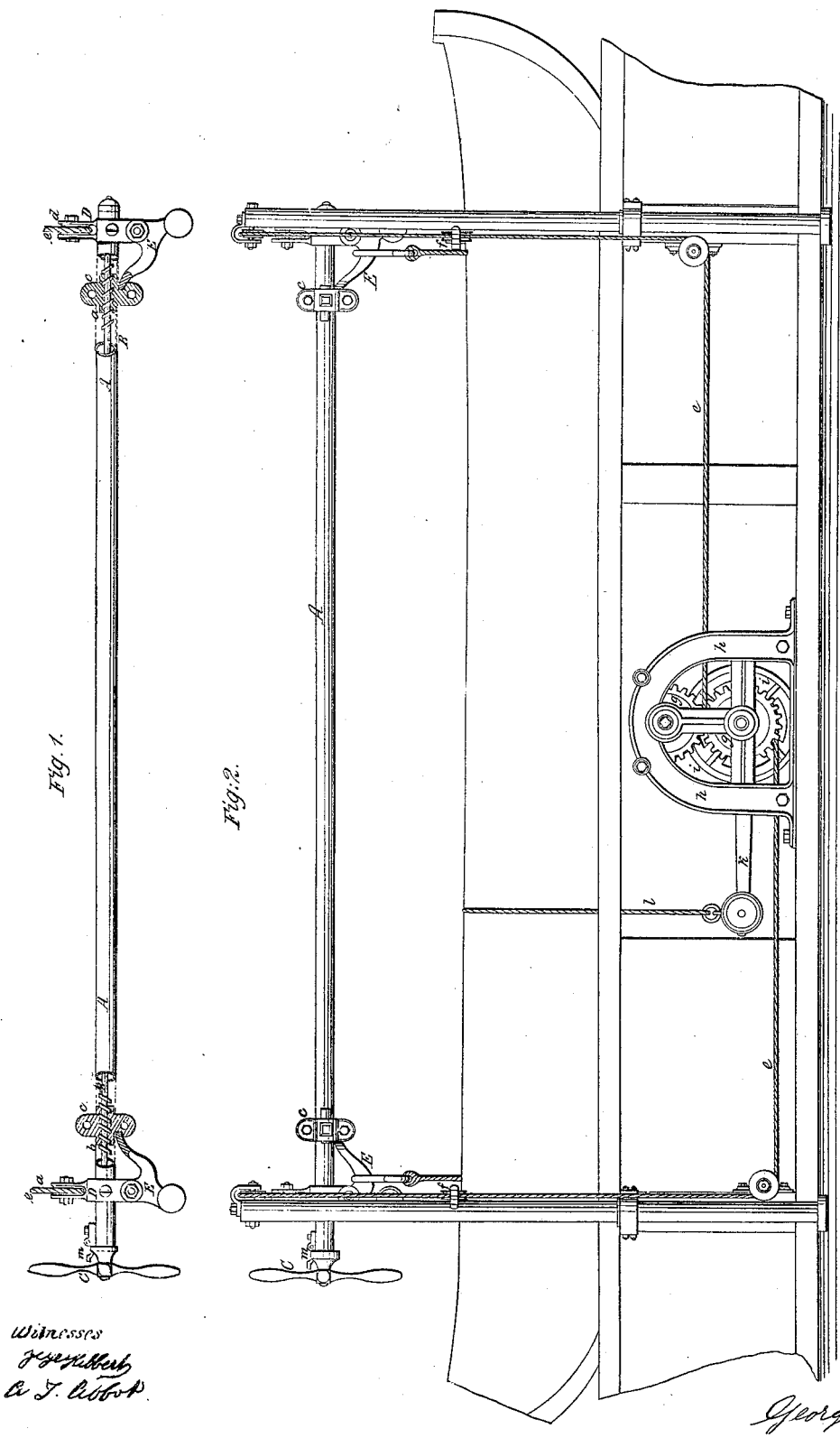

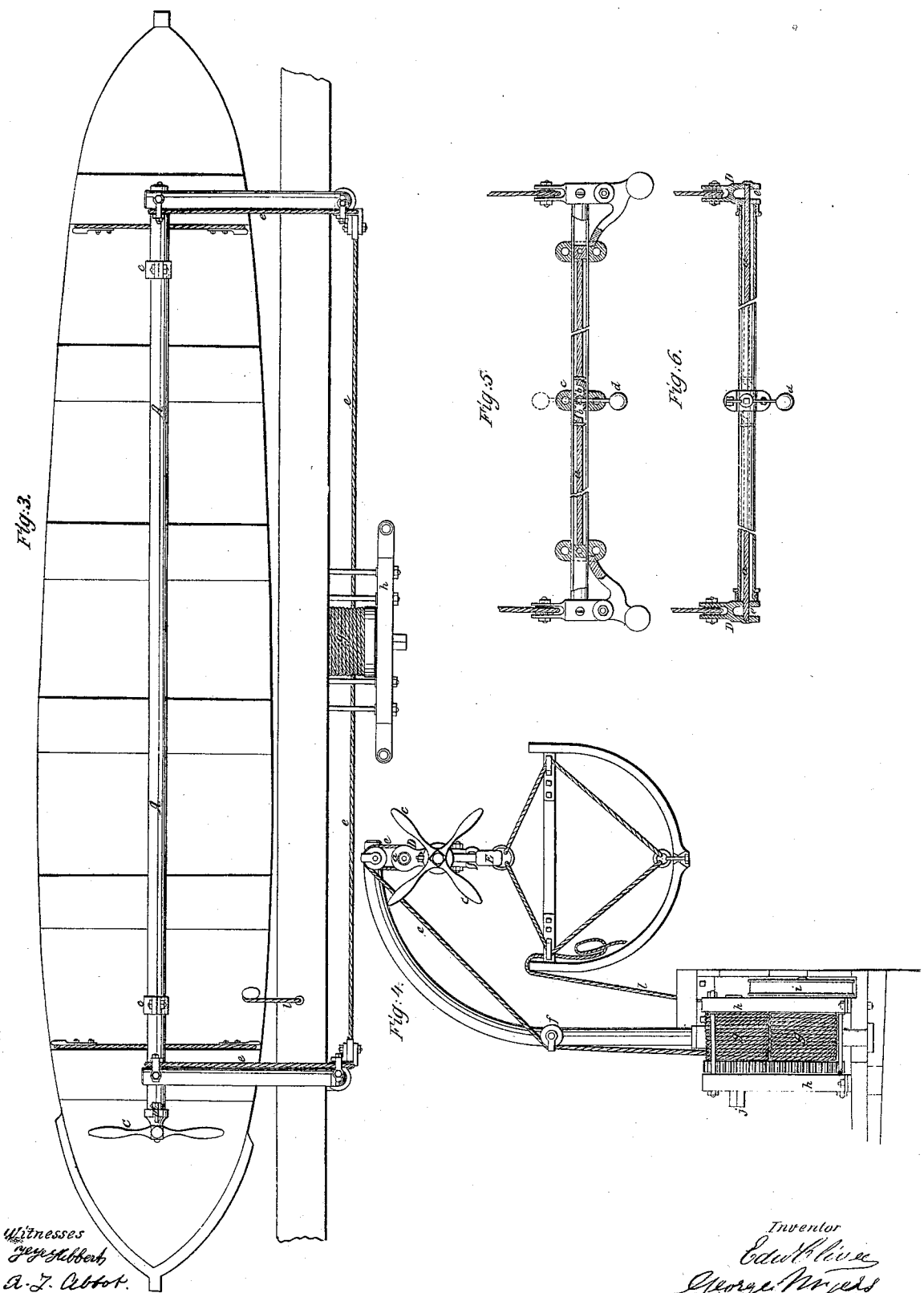

EDWARD OLIVER AND GEORGE MYERS, OF ROTHERHAM, GREAT BRITAIN.

IMPROVED APPARATUS FOR DISENGAGING BOATS FROM DAVITS.

Specification forming part of Letters Patent No. 53,550, dated March 27, 1866.

*To all whom it may concern:*

Be it known that we, EDWARD OLIVER, of Rotherham, in the county of York, in that part of the United Kingdom of Great Britain called England, engineer, and GEORGE MYERS, of the same place, draftsman, have invented certain Improvements in Apparatus for Lowering and Disengaging Boats from Vessels; and we do hereby declare that the following is a full and exact description thereof, reference being had to accompanying drawings and the letters and figures of reference marked thereon.

Our invention consists of an apparatus by which a boat can be lowered into the water on an even keel and both ends instantaneously freed from the tackle, and is as follows: Over the boat is a tube having a rod and bar in the inside furnished with a right-handed screw at one end and a left-handed screw at the other. Over the screwed portions nuts are made to travel, as hereinafter explained. The tube is fitted at each end with a pulley-block and a weighted hook. To the weighted hooks the boat is suspended, the points of the hooks being held by het nuts to prevent the boat leaving them until disengaged. The ropes pass round the pulley-blocks before mentioned to other pulley-blocks on the ends of the davits, and from thence to barrels fitted to suitable framing firmly bolted to the deck of the ship. The barrels are geared, and their rotation is governed by means of a brake under the control of a man in the boat. The rod or bar has at one end a small hand-wheel, by which it is turned.

Figure 1 of the accompanying drawings is an elevation, partly in section, of an apparatus for lowering and disengaging boats from vessels constructed according to this invention. Fig. 2 is a side elevation of the same shown suspended from the davits of a vessel; Fig. 3, a plan, and Fig. 4 an end view, with the boat in section for the purpose of illustrating more clearly the tackle by which it is suspended when raised out of the water.

A is a tube, which may be of any length. This tube is furnished in the interior with a rod, B, having a right-handed screw, $a$, at one end and a left-handed screw, $b$, at the other. Each of these screws carries a threaded nut, $c\,c$. These nuts we prefer to make in two halves and connect them by bolts or other fastenings. The nuts, when firmly secured together to form a nut, are made to travel along the threaded portions of the rod when actuated by means of the handle C or the hand-wheel. The handle may be fitted at one end only, or handles may be fitted at both ends to enable the rod being worked from either end of the tube.

Near each extremity of the tube A we secure a brace, D, and to each brace we attach a weighted hook, E. The nose of each of the hooks are caused to enter a recess formed in the under part of each of the nuts when they are moved nearer the extremities of the tube. The upper part of each brace carries a sheave-block, $d\,d$, over or around which a rope, $e$, is led. One end of each of the ropes is secured to the upper part of each davit, from whence they pass round the sheave-block before mentioned, over a second pulley, $f\,f$, on the lower part of the davits, thence to barrels $g\,g$ of a capstan or winch placed inboard, sufficient rope being wound on the barrels to enable the boat to be lowered into the water when required. The barrels are placed one above the other in their framing $h$, and are geared by tooth-gearing. The axle carrying the lower barrel has a band-wheel or brake, $i$, attached to it. This brake is furnished with a steel or other strap connected to a weighted lever, $k$. The outer end of the lever $k$ has a rope, $l$, attached, which is passed over the gunwale into the boat to be lowered. The rope $l$ is for the purpose of enabling a man in the boat to lower the same at any speed desired.

The upper barrel of the capstan is fitted with a square head, $j$, to which a winch-handle is attached when it is necessary to raise the boat out of the water. When the boat is suspended by the davits the threaded rod is prevented from turning by a catch, $m$, on the tube dropping into a recess formed in a shoulder on the rod. The catch being jointed allows of it being turned up, in which position it is retained by being thrown over toward the brace.

The action is as follows: When necessary to lower the boat a man releases the catch from a recess in the tube by simply raising it and throwing it back. He then seizes the rope connected with the weighted lever, whereby the brake is freed from its wheel. This allows the ropes passing off the barrels, whereby the boat is lowered. The speed at which it descends is regulated by the man paying out the rope more or less fast. When the boat reaches the water, which it does on an even keel, the man turns the handle in the required direction and releases the nose of the hooks from the nuts, when the weight of the slings causes the hooks to drop, and consequently the boat is freed therefrom.

The tube and parts connected therewith, as above described, would, when the boat is released therefrom, remain suspended to the davits; or, instead of securing the apparatus to the davits, it may be attached to the boat in any suitable manner.

In the modification represented in Fig. 5 we make use of two rods, $a\,a$, having their inner ends, $b\,b$, curved and furnished with a rack. The teeth of the rack are geared into by a pinion, $c$, which is caused to rotate from the outside by a weighted lever, $d$, or hand-wheel.

In Fig. 6 we have shown another modification, by which we are enabled to dispense with the weighted hooks. The ring or hook of the fixed tackle in the boat is inserted through apertures $e\,e$ in the end pieces or braces, D D, and the rods $a\,a$ being passed through the rings or hooks into recesses in the braces, as shown, whereby the boat is suspended.

Having now fully described and ascertained the nature of this our said invention, and how the same is to be performed, we wish it to be understood that we do not confine ourselves to the relative proportions or dimensions hereinbefore described and set forth, as the same may be considerably varied without departing from the invention; but

What we claim as new and our invention is—

1. The tube A, inclosing the rod B, formed with right-handed and left-handed screws $a$ and $b$, with their screw-threaded nut recessed to receive the pointed ends of the hooks E E, and handle or hand-wheel C, the braces D, with their weighted hooks E E, and the locking-catch $m$, the whole being arranged substantially in the manner and for the purposes hereinbefore described and set forth.

2. The double-barreled windlass, with its weighted lever-brake $k$, substantially in the manner and for the purposes hereinbefore described and set forth.

3. The two rods $a\,a$, with their curved inner ends, $b\,b$, and furnished with a rack, the teeth of the said rack gearing into the pinion $c$, which is caused to rotate from the outside by the weighted lever or hand-wheel $d$, the whole being operated substantially in the manner and for the purpose hereinbefore described and set forth.

4. Forming the lower end of the brace-pieces D D with the jaw-pieces $c\,c$, for inserting the ring or hooks by which the boat is suspended, and passing the rods $a\,a$ through the hooks or the eye of the rings by which the boat is suspended, the same being operated substantially in the manner and for the purposes hereinbefore described.

In witness whereof we, the said EDWARD OLIVER and GEORGE MYERS, have hereunto set our hands and seals this 27th day of January, in the year of our Lord 1866.

EDWD. OLIVER. [L. S.]
GEORGE MYERS. [L. S.]

Witnesses:
F. F. HIBBERT,
A. T. ABBOT.